(12) United States Patent
Bardalai (10) Patent No.: US 8,369,704 B2
(45) Date of Patent: Feb. 5, 2013

(54) OPTICAL NETWORK COMPUTATION ENGINE

(75) Inventor: Shigdho Chandra Bardalai, Plano, TX (US)

(73) Assignee: Fujitsu Limited, Kawasaki-Shi (JP)

( * ) Notice: Subject to any disclaimer, the term of this patent is extended or adjusted under 35 U.S.C. 154(b) by 418 days.

(21) Appl. No.: 12/710,177

(22) Filed: Feb. 22, 2010

(65) Prior Publication Data

US 2011/0206368 A1 Aug. 25, 2011

(51) Int. Cl.
*H04B 10/00* (2006.01)

(52) U.S. Cl. .......................................... 398/25; 398/66

(58) Field of Classification Search .................... 398/60, 398/66–72, 25
See application file for complete search history.

(56) References Cited

U.S. PATENT DOCUMENTS

2012/0114329 A1* 5/2012 Lee et al. ...................... 398/26

* cited by examiner

*Primary Examiner* — Leslie Pascal
(74) *Attorney, Agent, or Firm* — Baker Botts L.L.P.

(57) ABSTRACT

An apparatus for computing optical network characteristics may comprise: a plurality of network elements arranged into two or more domains; two or more optical computation engines, each of the two or more optical computation engine associated with a respective one of the two or more domains; and a centralized path computation engine configured to interface with the two or more optical computation engines to calculate one or more characteristics of the optical path. Each of the two or more domains may comprise one or more network elements sharing a common operational characteristic. The plurality of network elements may be in optical communication along an optical path, the optical path including a first network element at an origin of the optical path and a final network element at a terminus of the optical path. The two or more optical computation engines may be configured to perform calculations related to the optical performance of the network elements associated with the same domain as the optical computation engine.

14 Claims, 5 Drawing Sheets

OPTICAL NETWORK COMPUTATION ENGINE

TECHNICAL FIELD OF THE INVENTION

The present invention relates generally to optical communication systems, and more particularly to a system and method for computing optical network characteristics.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss. Optical networks provide higher capacity and reduced operating costs compared to traditional technologies.

Design and operation of optical networks may include feasibility analysis for the network as a whole or sub-networks within a larger network. For example, an optical computation engine may determine the optical signal performance of a proposed service and/or application. In an optical network including components supplied by a plurality of vendors, these calculations may be difficult or impossible because each vendor may have a proprietary communication protocol. Vendors may also integrate their proprietary implementations with control-plane applications which may not allow a network control system to model the performance of those devices.

Further, there is no agreed standard for optical computations. In fact, in most cases, each vendor considers the algorithms and details for computing optical feasibility of that vendor's components to be proprietary.

SUMMARY

In accordance with a particular embodiment of the present invention, a system for computing optical network characteristics is provided. The system may include a plurality of network elements arranged into two or more spans, two or more optical computation engines, and a universal path computation engine configured to interface with the two or more optical computation engines to calculate one or more characteristics of the plurality of network elements arranged into two or more spans. Each span may comprise one or more network elements sharing a common operational characteristic protocol. Each optical computation engine may be configured to compute an optical feasibility of an associated one of the two or more spans. The optical feasibility of a span may depend at least in part on the common operational characteristic protocol shared by the one or more network elements in the span.

In accordance with another particular embodiment of the present invention, a method for computing a feasibility for an optical path between optical network devices is provided. The method may include receiving a list of network elements along the optical path, the optical path including a first network element at an origin of the optical path and a final network element at a terminus of the optical path. The method may also include receiving a list of spans along the optical path, each span including a set of one or more network elements and each span having a predetermined operational characteristic protocol. The method may include querying a set of two or more optical computation engines, each optical computation engine configured to interact with an associated span based at least on the predetermined operational characteristic protocol of that span. The method may include calculating one or more optical performance parameters of the optical path based at least in part on the responses from the set of two or more optical computation engines.

In accordance with another particular embodiment of the present invention, a method for computing optical transfer parameters for an optical path between optical network devices is provided. The method may comprise receiving a list of network elements along the optical path, the optical path including a first network element at an origin of the optical path and a final network element at a terminus of the optical path. The method may include receiving a list of spans along the optical path, each span including a set of one or more network elements and each span having a predetermined operational characteristic protocol. The method may include receiving a set of input optical transfer parameters at the origin of the optical path. The method may include querying a set of two or more optical computation engines, each optical computation engine configured to interact with a span based at least on the predetermined operational characteristic protocol of that span. The method may include calculating a set of output optical transfer parameters at the terminus of the optical path based at least in part on the responses from the set of two or more optical computation engines.

Teachings of the present disclosure may provide an optical network including a standard path computation engine (PCE) integrated with one or more proprietary optical computation engines (OCE). Use of a standard path computation engine may allow the engine to be hosted in a control plane. In contrast to solutions requiring intensive computation in the management plane, control plane solutions may allow a more efficient use of computing resources and would not require a separate management plane solution for each proprietary OCE.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1:
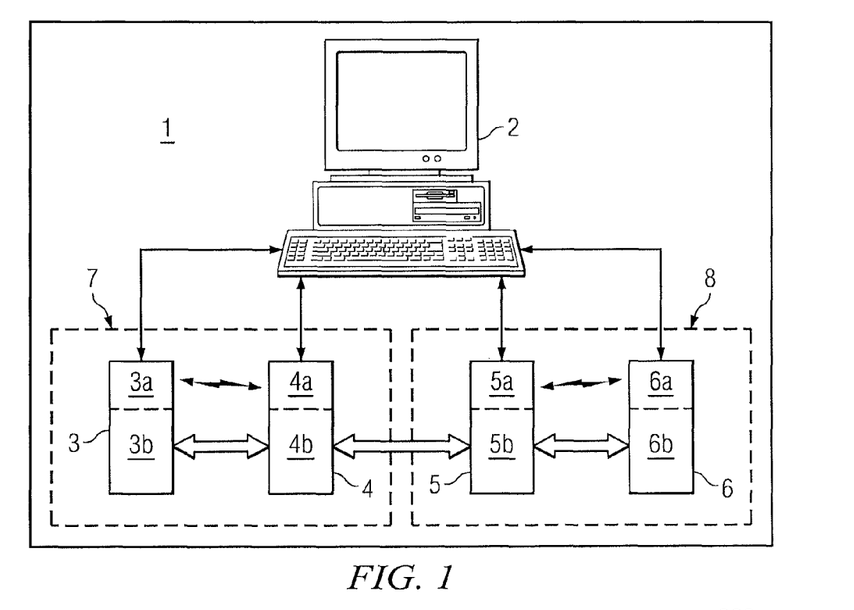
FIG. 1 shows an example system 1 incorporating teachings of the present disclosure.

FIG. 1 shows an example system 1 incorporating teachings of the present disclosure. System 1 may include central management host 2, and network elements 3-6. In an optical communications network, it is typical to refer to a management plane, a control plane, and a transport plane (sometimes called the physical layer). In the context of this disclosure, the transport plane refers to optical communication between network elements 3-6, indicated by the large hollow arrows.

The central management host 2 resides in the management plane and may configure and supervise the components of the control plane. The management plane includes ultimate control over all transport plane and control plane entities (e.g., network elements). As an example, the management plane may consist of a central processing center, including one or more processing resources, data storage components, etc. (e.g., central management host 2). The management plane may be in electrical communication with the elements of the control plane 3a-6a and may also be in electrical communication with one or more network elements 3b-6b of the transport plane. The management plane may perform management functions for an overall system (e.g., system 1) and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Each network element 3-6 may include an optical device, 3b-6b, and an imbedded controller 3a-6a. Controllers 3a-6a may comprise the control plane for system 1. The control plane configures and operates the individual network elements 3-6 in the transport plane. The elements of the control plane may be in electrical communication with each other and the network elements. In the embodiment shown in FIG. 1, network elements 3 and 4 are in electrical communication with each other as shown by the arrow between 3a and 4a, but not with the remaining network elements 5 and 6.

In the context of this disclosure, a domain may refer to a group of one or more components and/or network elements sharing at least one common operational characteristic (e.g., a communication protocol). In one example, a domain may include a set of network elements sold by a particular vendor. Each vendor may employ a proprietary communication protocol shared by the set of network elements in the domain. An additional example of groupings in a domain include network elements that have associated control plane elements sharing electrical interoperability. As shown in FIG. 1, network elements 3 and 4 would be included in domain 7 and network elements 5 and 6 would be in separate domain 8.

Figure 2:
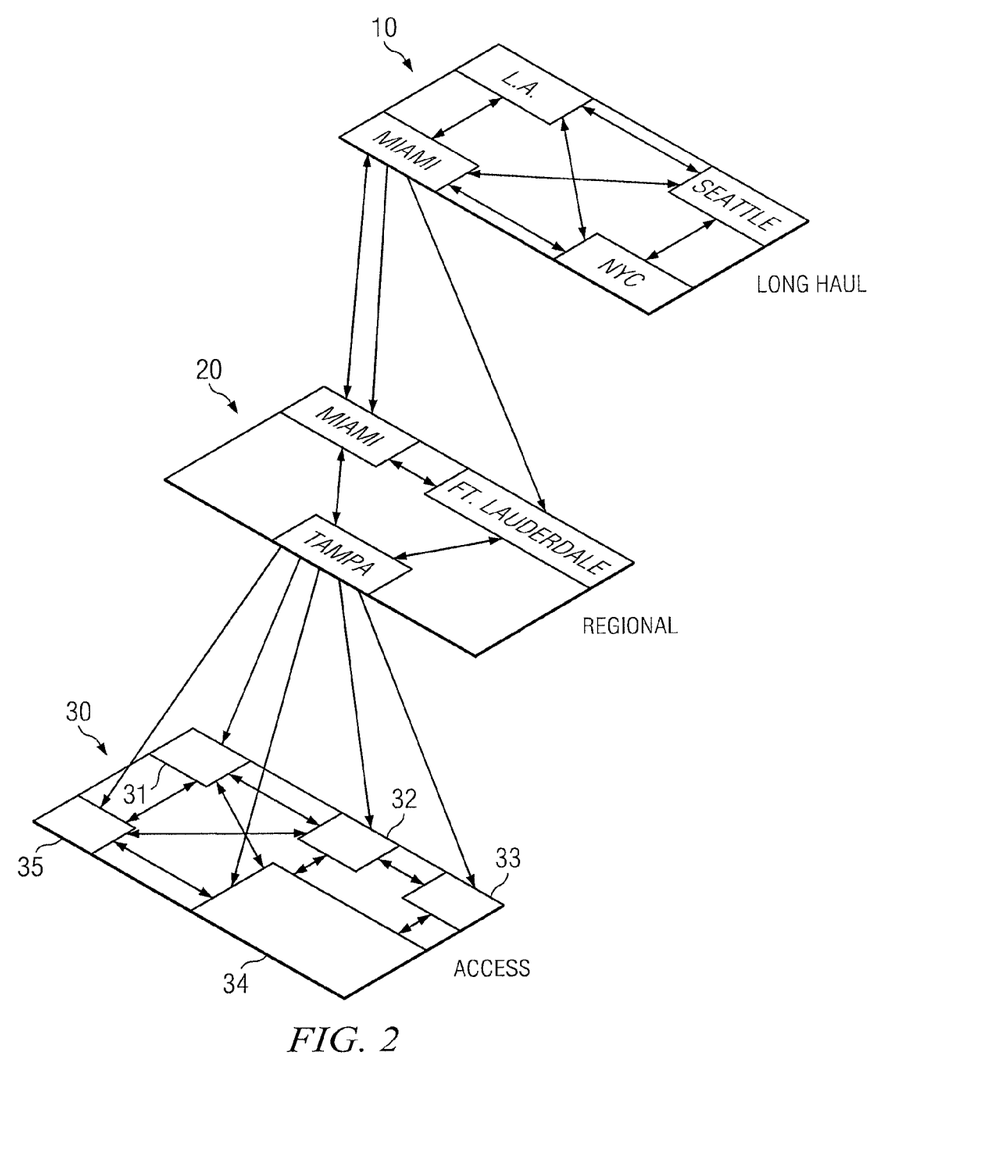
FIG. 2 illustrates multiple layers of an optical communications network in accordance with the teachings of the present disclosure.

FIG. 2 illustrates multiple layers of an example optical communications network in accordance with the teachings of the present disclosure. In long haul network 10, large capacity trunks may provide connections between geographically separated locations. Offered only as an example, long haul network 10 shows connections and/or trunks running between network elements located in several United States cities, namely New York City, Seattle, Los Angeles, and Miami.

In regional network 20, medium capacity branches may provide connections between network elements in neighboring geographical locations. As an example, regional network 20 shows connections between network elements in cities located in southern Florida, namely Miami, Fort Lauderdale, and Tampa.

In access network 30, an optical communications network may provide individual connections between network elements in a particular city, such as Tampa. In FIG. 2, network elements are represented at numerals 31, 32, 33, 34, and 35. As an example, access network 30 may include network elements located at residences, company locations, central switchboards, etc. Network elements may include devices and/or components configured to perform many functions, individually and/or in concert.

For example, a telephone exchange includes a variety of network elements geographically distributed to perform the collective functions of communication. In a telephone exchange, network elements may include subscriber lines and equipment, line trunk units, a switching matrix, a CPU, and/or remote hubs. As another example, computing systems may include network elements distributed across several geographical locations (e.g., multiple datacenters, worksites, etc.).

In these examples, the variety of network elements may be distributed across a plurality of domains. For example, each geographical location in access network 30 may include network elements from one or more vendors. As another example, a single management plane system may manage long haul network 10 and interface with a separate domain for each regional network and/or each access network. As another example, access network 30 may include multiple domains based on interoperability of the included network elements. The ability to manage network elements across a plurality of domains may provide increased efficiency and/or flexibility.

Optical computation systems may be implemented in optical communication networks to determine expected performance of a service, the feasibility of a transmission path between network elements, circuit planning, setup purposes, etc. These computations have not been standardized across vendors. In fact, many vendors incorporate proprietary implementations and/or protocols that are not generally compatible with implementations from another vendor. For these reasons, most optical computation systems must be hosted in the control plane of each domain rather than the centralized management plane.

Given the size and diversity of optical networks, such as those discussed above, an optical computation system that could work across components from many vendors may provide a centralized solution. In the context of this disclosure, a centralized component refers to a component and/or a device associated with the management plane, rather than a collection associated with the control plane (e.g., distributed across multiple network elements). Teachings of the present disclosure provide an optical computation system that operates across one or more domains and, thus, may allow a centralized solution.

A centralized solution may provide several benefits in comparison to a distributed solution. For example, a centralized management solution may take advantage of a substantially greater amount of computing resources in the management plane. In contrast, a distributed solution using control plane elements may operate with significantly limited resources. When a computation system must be implemented on a distributed network, a typical solution results in reduced accuracy in order to keep the computations simple and less time consuming.

An optical computation system incorporating teachings of the present disclosure may include a central path computation engine (PCE). A centralized PCE may provide more accurate predictions about the optical performance of applications or the optical feasibility of certain paths along an optical communications network. The use of a centralized PCE may require the PCE to communicate with proprietary optical computation engines (OCE) associated with each vendor domain. The communication between proprietary OCEs may be limited by the desire of each vendor to keep its feasibility and performance algorithms and/or data confidential. In general, one vendor's proprietary OCE is not compatible with any other vendor's proprietary OCE.

Figure 3:
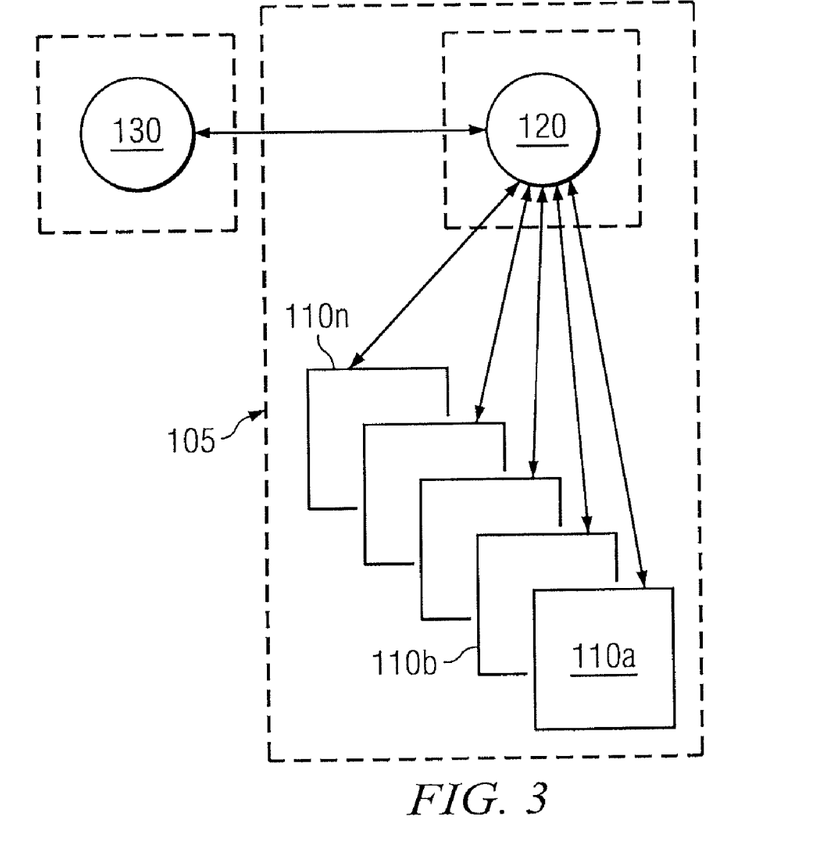
FIG. 3 illustrates an example optical communications network with a fully centralized path computation engine and optical computation engine in accordance with the teachings of the present disclosure.

FIG. 3 illustrates an example optical communications network 100 including multiple network elements 110a-110n from a single domain 105, a optical computation engine 120 associated with domain 105 in communication with each network element, and a path computation engine 130 in accordance with the teachings of the present disclosure. Optical communications network 100 may be any collection of network elements as discussed above.

Network elements 110 may include any components, devices, and/or features of optical communication network 100. As discussed above, network elements 110 may include devices transmitting signals, performing operations, etc. For example, network elements 110 may include nodes and/or links (e.g., amplifiers, switches, add-drop multiplexers (ADM), and/or reconfigurable add-drop multiplexers (ROADM)).

Optical computation engine (OCE) 120 may include any component and/or device configured to provide computation capabilities related to network elements 110. In this example, OCE 120 is associated with the management plane of optical communications network 100. In optical communications network 100, OCE 120 is centralized rather than distributed. OCE 120 may be used to plan network connections among network elements 110, planning circuits, and computations for control-plane circuit planning and design.

As shown in FIG. 3, OCE 120 provides calculations and data related to each network element 110 for use by path computation engine 130. OCE 120 may operate based on a standardized protocol for communication between network elements provided by multiple vendors. In other embodiments, OCE 120 may perform high level status checks and calculations rather than detailed performance models for each network element 110. The lack of detailed performance predictions and models for each network element 110 may allow OCE 120 to operate without the need for detailed proprietary data related to each network element 110.

Path computation engine (PCE) 130 may include any device and/or component configured to provide computation capabilities related to OCE 120 and/or network elements 110. In this example, PCE 130 is centralized and associated with the resources of the management plane. PCE 130 may provide path-computation capabilities without predicting the optical performance of the computed path.

For example, PCE 130 may initiate a request for a new route or optical path between an origin point (e.g., network element 110a) and a final point (e.g., network element 110n). PCE 130 may query OCE 120 to determine the optical performance of the generated path. OCE 120 may collect data related to the origin point, the final point, and all intervening points and/or network elements 110. In one example, the data collected by OCE 120 may include a topology and an inventory of network elements 110 in optical communication with the origin point and the final points.

OCE 120 may use the data to compare alternative paths and/or to determine whether proposed paths are feasible. As an example, when evaluating a proposed optical path, OCE 120 may employ one or more criteria to compare alternative paths. OCE 120 may consider a minimum required bandwidth, any administrative rules imposed by the network designer, data from PCE 130, and/or any other mathematical operations useful in comparing proposed network paths. In an alternative embodiment, PCE 130 may receive intermediate data and/or calculations from OCE 120 to make final determinations based on one or more criteria for comparing alternative paths.

OCE 120 may be operable to perform various functions in support of optical communications network 100. For example, OCE 120 may be operable to assign a wavelength to a signal based on the assessment of an optical path. As another example, OCE 120 may be operable to compute the optical feasibility of a proposed optical path given a set of network elements 110 (e.g., for a given wavelength). As another example, given a proposed optical path and a set of input optical signal attributes, OCE 120 may be operable to compute a set of output signal attributes.

Figure 4:
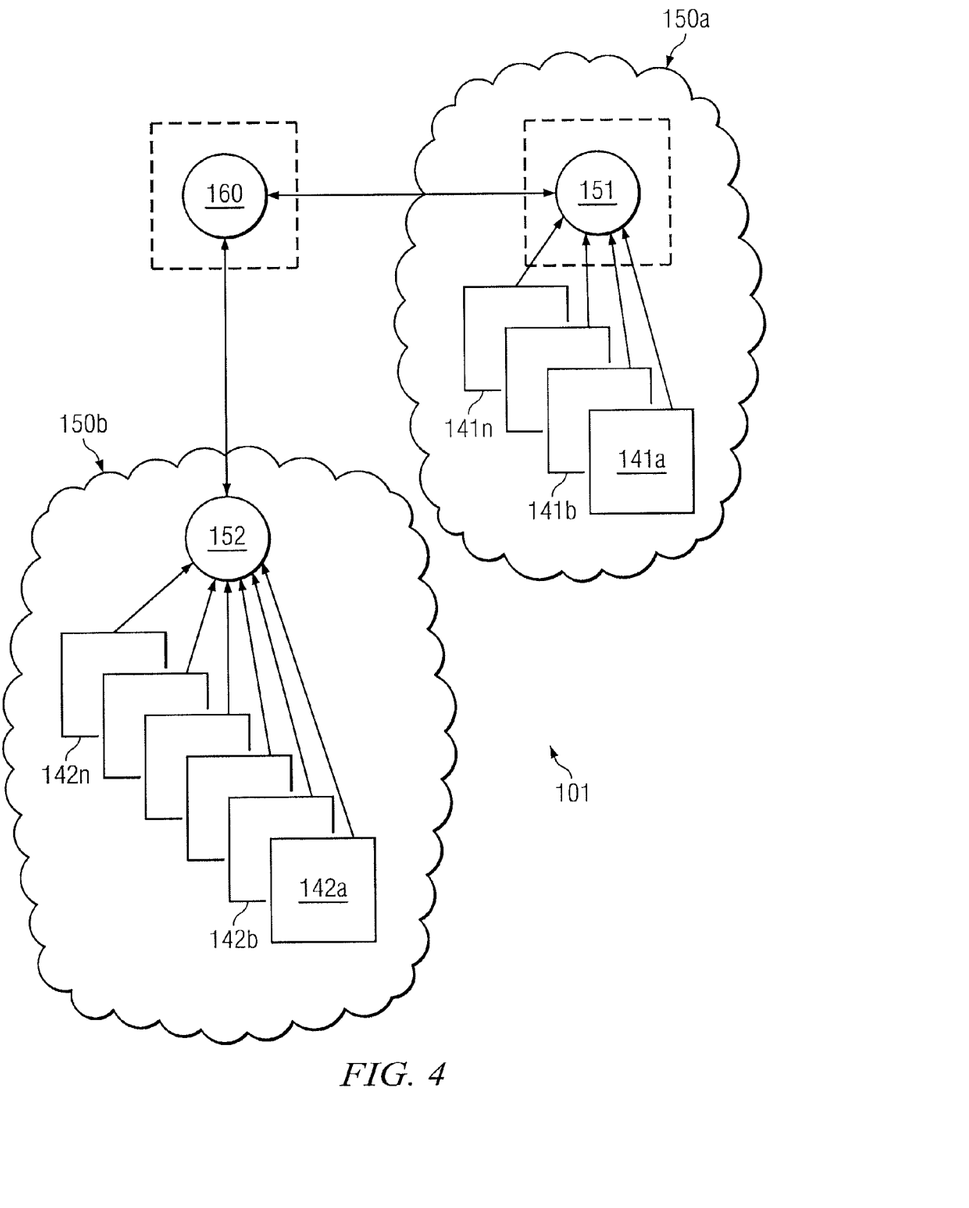
FIG. 4 illustrates an example network with a centralized path computation engine and a set of optical computation engines in accordance with the teachings of the present disclosure.

FIG. 4 illustrates an example optical communication network 101 with multiple domains 150 of network elements. Optical communication network 101 also includes a centralized path computation engine (PCE) 160 and a set of optical computation engines (OCE) 151 and 152 in accordance with the teachings of the present disclosure. Optical communication network 200 may be described as "centralized per domain" because PCE 160 is associated with the management plane and OCE 151 and OCE 152 may be associated in part with both the management plane and the control plane of each domain 150.

In the embodiment shown in FIG. 4, network elements 141a-141n are grouped into a first domain 150a. Domain 150a is characterized by at least a first common operational characteristic protocol shared by all network elements 141 within domain 150a. In one example, network elements 141 may all be produced and/or supported by a single vendor. Segregation of network elements 141 into domain 150a may allow a single communication and/or calculation protocol to be used for all network elements 141 in domain 150a. Domain 150b includes a set of network elements 142a-142n characterized by at least a second common optical protocol shared by all network elements 142.

PCE 160 operates in a similar manner to PCE 130 discussed in relation to FIG. 2. For example, PCE 160 may be associated with the management plane and may be centralized. PCE 160 may be in electronic communication with an OCE for each domain 150 (e.g., OCE 151 and OCE 152). PCE 160 may be described as a common PCE, or a third party PCE, in contrast to a proprietary PCE.

In optical communications network 101, each OCE may interact with only the network elements in the same domain 150. For example, OCE 151 may be in electronic communication with network elements 141a-141n but not with those in domain 150b (e.g., network elements 142a-142n). OCE 151 may include a proprietary traffic engineering database (TED) including proprietary data regarding network elements 141. A TED in OCE 151 may include the topology and/or inventory of network elements associated with domain 150a. OCE 151 may complete calculations upon request from PCE 160 but may be configured to communicate only summary results instead of the underlying proprietary data.

Because OCE 151 is associated with domain 151 and not domain 152, any proprietary data can be protected. In such embodiments, PCE 160 can provide calculations for optical communication network 101 without compromising any proprietary data related to the individual network elements (e.g., 141a-141n and 142a-142n). PCE 160 may be provided by a network operator and may be designed to comply with one or more carrier protocols.

OCE 151 and OCE 152 may be able to perform various functions related to optical computation for their associated domain 150. Although the following discussion highlights the operation of OCE 151, additional domains and OCEs can be implemented using the teachings of the present disclosure. There is no inherent limit to the number OCEs or domains that can be used to implement optical communications network 101.

As one example, OCE 151 may be operable to assign wavelengths to signals travelling through domain 150a. As another example, OCE 151 may be operable to calculate a set of output signal characteristics given a proposed path of network elements 141 and a set of input signal characteristics. As another example, OCE 151 may be able to calculate a feasibility score or rating for any proposed path of network elements 141 within domain 151. A feasibility score or rating may depend on criteria enforced by PCE 160 and/or set by the network manager (e.g., the signal carrier).

As another example, PCE 160 may request an optical path between network element 141a and 142b. OCE 151 may calculate an optical path from network element 141a to the boundary of domain 150a. OCE 152 may calculate an optical path from network element 142b to the boundary of domain 150b. PCE 160 may collect data provided from both OCE 151 and OCE 152 to determine an optical path for use by optical communications network 101.

Figure 5:
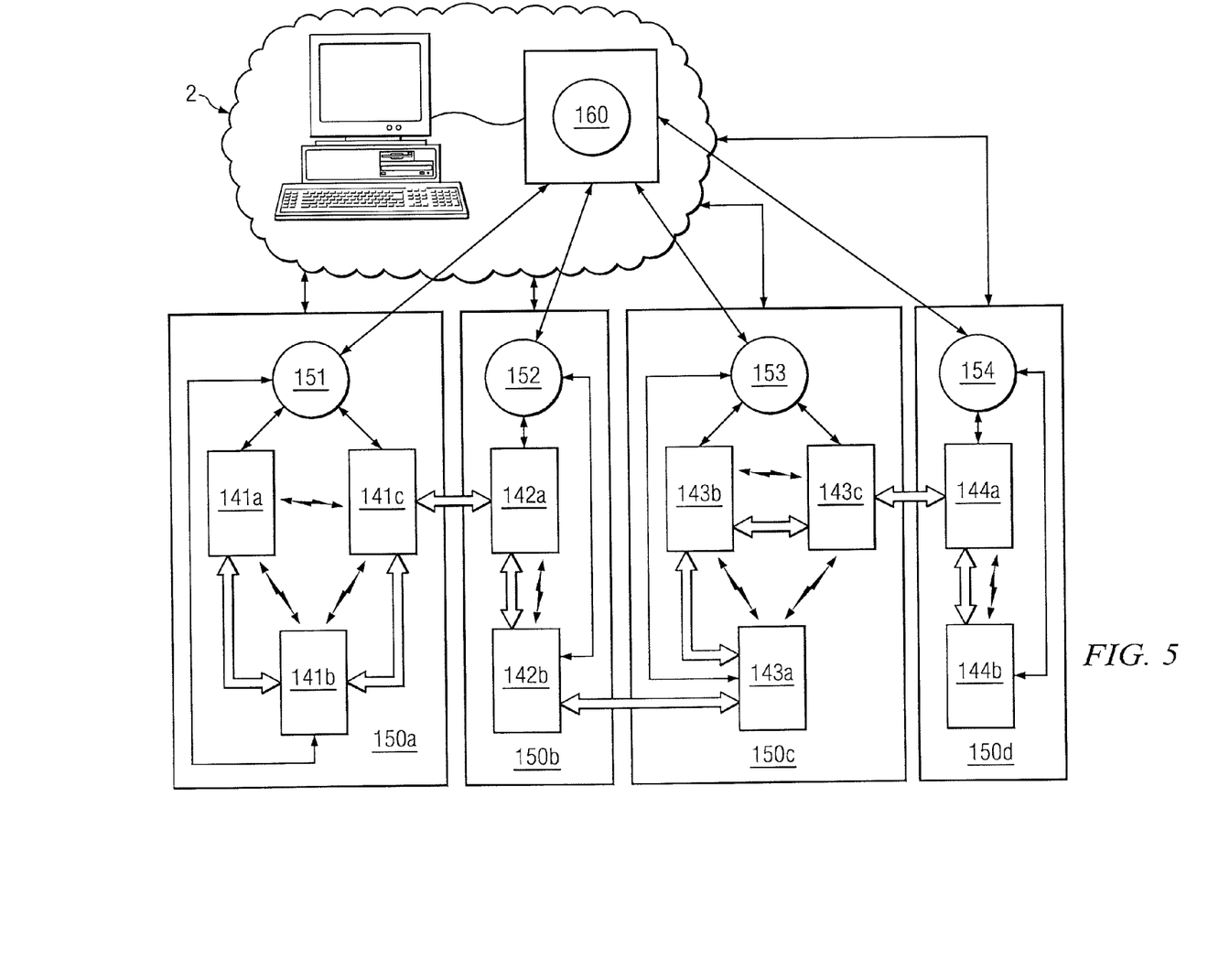
FIG. 5 shows a block diagram of network elements distributed in an optical communications network in accordance with teachings of the present disclosure.

FIG. 5 shows a block diagram of network elements 140 distributed in an optical communications network in accordance with teachings of the present disclosure and an example optical communication path between the depicted elements. Each network element 140 is characterized at least in part by its assignment to a single domain 150. In FIG. 5, the optical communication path is indicated by the large, hollow arrows, while electrical communication is indicated by single lines. As discussed in relation to previous figures, path computation engine 160 may be associated with management plane 2, while each domain 150 has an associated optical computation engine 151-154. Each OCE 151-154 may be in electrical communication with the centralized PCE, but there may be no direct communication between the separate OCEs 151-154.

The optical communication path depicted in FIG. 5 includes an origin at network element 141a and a terminus at network element 144b. A path may be defined across any number of network elements 140 crossing any number of domains 150. In one embodiment, the origin of an optical path and the terminus of the optical path both include an optical-electrical converter (O/E converter) (e.g., an optical cross-connect, and an optical switch). For example, either the origin or the terminus of the optical path may include an optical-electrical-optical (O-E-O) switch controlled by the management plane to handle various transport, cross-connect, and data distribution across one or more of the plurality of network elements.

The combination of centralized PCE 160 and OCEs 151-154 associated with domains 150a-150d may provide robust calculations at the request of the network administrator and/or carrier. For example, OCE 151 may be asked to determine whether an optical path starting at network element 141a, passing through network element 141b, and terminating at network element 141c is feasible according to the rules imposed by PCE 160. Example criteria include, but are not limited to, number of nodes in the optical path, total length of the optical path, total path polarization mode dispersion (PMD), total path optical signal to noise ratio (OSNR), and/or total path residual dispersion (RD).

In an alternative application, OCE 153 may be asked to provide output optical parameters at the end of a path from network element 143a to network element 143c based on a set of input optical parameters provided by PCE 160. Example optical parameters include, but are not limited to, polarization mode dispersion (PMD), optical signal to noise ratio (OSNR), pass band penalty (PBN), dispersion penalty, and/or cross-talk.

Figure 6:
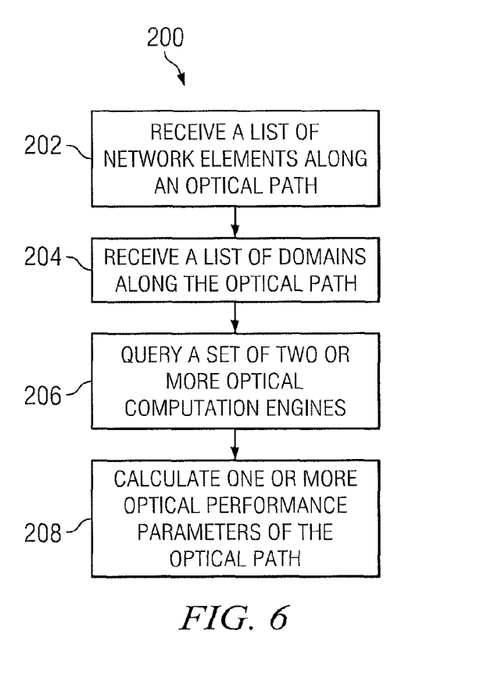
FIG. 6 illustrates an example method for computing a feasibility for an optical path between optical network devices in accordance with teachings of the present disclosure.

FIG. 6 illustrates an example method 200 for computing a feasibility for an optical path between network elements in accordance with teachings of the present disclosure. As discussed with relation to FIG. 5, an optical path may cross several network elements distributed across two or more domains. Each domain may have an associated optical computation engine in communication with a centralized path computation engine.

At step 202, a system for computing optical network characteristics may receive a list of network elements along the optical path. The optical path may include a first network element identifying an origin of the optical path and a final network element identifying a terminus of the optical path.

At step 204, a system for computing optical network characteristics may receive a list of domains along the optical path. Each domain may include a set of one or more network elements and each network element within a single domain may share a predetermined operational characteristic protocol.

At step 206, a system for computing optical network characteristics may query a set of two or more optical computation engines. Each optical computation engine may be configured to interact with an associated domain of network elements based at least on the predetermined operational characteristic protocol of that domain.

At step 208, a system for computing optical network characteristics may calculate one or more optical performance parameters of the optical path. The calculation of step 208 may be based at least in part on the responses from the set of two or more optical computation engines.

Figure 7:
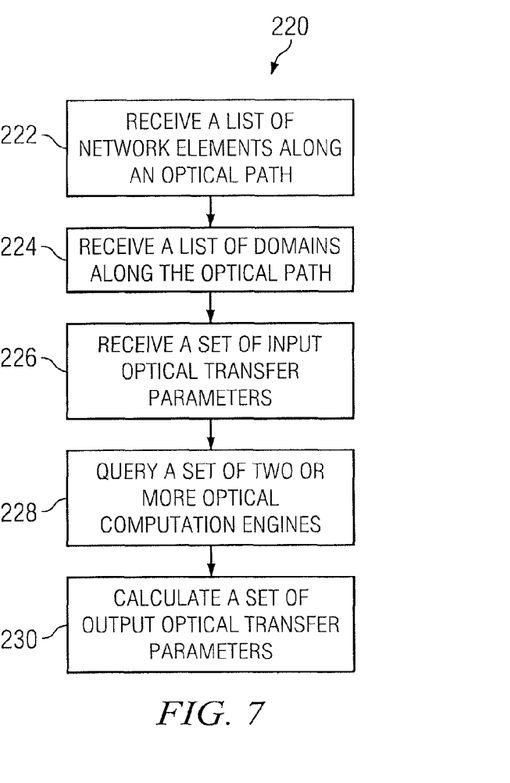
FIG. 7 illustrates an example method for computing optical transfer parameters for an optical path between optical network devices in accordance with teachings of the present disclosure.

FIG. 7 illustrates an example method 220 for computing optical transfer parameters for an optical path between optical network devices in accordance with teachings of the present disclosure. As discussed with relation to FIG. 5, an optical path may cross several network elements distributed across two or more domains. Each domain may have an associated optical computation engine in communication with a centralized path computation engine.

At step 222, a system for computing optical network characteristics may receive a list of network elements along the optical path. The optical path may including a first network element identifying an origin of the optical path and a final network element identifying a terminus of the optical path.

At step 224, a system for computing optical network characteristics may receive a list of domains along the optical path. Each domain may include a set of one or more network elements. Each domain may have a predetermined operational characteristic protocol.

At step 226, a system for computing optical network characteristics may receive a set of input optical transfer parameters at the origin of the optical path.

At step 228, a system for computing optical network characteristics may query a set of two or more optical computation engines. Each optical computation engine may be configured to interact with a single domain based at least on the predetermined operational characteristic protocol of that domain.

At step 230, a system for computing optical network characteristics may calculate a set of output optical performance parameters at the terminus of the optical path based at least in part on the responses from the set of two or more optical computation engines.

The various steps of methods 200 and 220 may be performed in the order shown in FIGS. 5 and 6, but may also be performed in alternative order, depending on the needs of the user and/or the system. Methods 200 and 220 may be described herein as being performed by a centralized PCE (e.g., PCE 120 and/or PCE 160), but this description should not be read to limit the applications of the teachings of the present disclosure.

Although the present invention has been described with several embodiments, various changes and modifications may be suggested to one skilled in the art. It is intended that the present invention encompass such changes and modifications as fall within the scope of the appended claims.

What is claimed is:

1. A system for computing optical network characteristics, the system comprising:
    a plurality of network elements arranged into two or more domains, each of the two or more domains comprising one or more network elements sharing a common operational characteristic protocol;
    the plurality of network elements in optical communication along an optical path, the optical path including a first network element associated with a first domain, the first network element at an origin of the optical path, and a final network element associated with a second domain, the final network element at a terminus of the optical path;
    two or more optical computation engines, each of the two or more optical computation engine associated with one of the two or more domains;
    the two or more optical computation engines configured to perform calculations related to the optical performance of the network elements associated with the same domain as the optical computation engine; and
    a centralized path computation engine configured to interface with the two or more optical computation engines, to receive from each of the optical computation engines one or more of the calculations related to the optical performance of the network elements associated with the same domain as each optical computation engine, and to compute an optical feasibility of a proposed path between the first network element and the final network element based on the received calculations.

2. A system according to claim 1, wherein each optical computation engine includes a proprietary traffic engineering database programmed with information regarding the performance characteristics of the network elements within the associated one of the two or more domains.

3. A system according to claim 1, further comprising the centralized path computation engine configured to assign a light wavelength for the proposed path.

4. A system according to claim 1, the centralized path computation engine further configured:
    to receive a set of input optical signal attributes;
    to apply the set of input optical signal attributes to the proposed path; and
    to compute a set of output optical signal attributes based at least in part on the proposed path.

5. A system according to claim 1, wherein the plurality of network elements interwork at the electrical layer.

6. A system according to claim 1, wherein the plurality of network elements interwork at the optical layer.

7. A method for computing a feasibility for an optical path between optical network devices, the method comprising:
    receiving a list of network elements along the optical path, the optical path including a first network element at an origin of the optical path and a final network element at a terminus of the optical path;
    receiving a list of domains along the optical path, each domain including a set of one or more network elements and each domain characterized by a predetermined operational characteristic;
    wherein the first network element and the final network element belong to distinct respective domains;
    querying a set of two or more optical computation engines, each optical computation engine configured to interact with an associated domain based at least on the predetermined operational characteristic of that domain;
    receiving from each of the optical computation engines one or more calculations related to the optical performance of the network elements associated with the same domain as each optical computation engine; and
    computing an optical feasibility of a proposed path between the first network element and the final network element based on the received calculations.

8. A method according to claim 7, wherein each optical computation engine includes a proprietary traffic engineering database programmed with information regarding the performance characteristics of the network elements within the associated domain.

9. A method according to claim 7, further comprising computing a total length of the optical path.

10. A method according to claim 7, further comprising computing a total path polarization mode dispersion for the optical path.

11. A method according to claim 7, further comprising computing a total path optical signal to noise ratio for the optical path.

12. A method according to claim 7, further comprising calculating a total path residual dispersion for the optical path.

13. A method for computing optical transfer parameters for an optical path between optical network devices, the method comprising:
    receiving a list of network elements along the optical path, including a first network element at an origin of the optical path and a final network element at a terminus of the optical path;
    receiving a list of domains along the optical path, each domain including a set of one or more network elements and each domain having a predetermined operational characteristic;
    receiving a set of input optical transfer parameters at the origin of the optical path;
    querying a set of two or more optical computation engines, each optical computation engine configured to interact with a respective domain based at least on the predetermined operational characteristic of the one or more network elements in the respective domain;
    receiving from each of the optical computation engines one or more calculations related to the optical performance of the network elements associated with the same domain as each optical computation engine; and calculating a set of output optical transfer parameters at the terminus of the optical path based at least in part on the calculations from the set of two or more optical computation engines.

14. A method according to claim 13, wherein each optical computation engine includes a proprietary traffic engineering database programmed with information regarding the performance characteristics of the network elements within a single domain.

* * * * *

UNITED STATES PATENT AND TRADEMARK OFFICE
CERTIFICATE OF CORRECTION

| | | |
|---|---|---|
| PATENT NO. | : 8,369,704 B2 | |
| APPLICATION NO. | : 12/710177 | |
| DATED | : February 5, 2013 | |
| INVENTOR(S) | : Snigdho Chandra Bardalai | |

It is certified that error appears in the above-identified patent and that said Letters Patent is hereby corrected as shown below:

On the title page of the patent: (75) Inventor:

Delete "Shigdho" and insert --Snigdho--.

Signed and Sealed this
Eleventh Day of November, 2014

Michelle K. Lee
*Deputy Director of the United States Patent and Trademark Office*